Patented July 27, 1954

2,684,924

UNITED STATES PATENT OFFICE 2,684,924

N-CHLOROPHENYLDIGUANIDINO COMPOUNDS

Francis Leslie Rose and Geoffrey Swain, Blackley, Manchester, England, assignors to Imperial Chemical Industries Limited, a corporation of Great Britain No Drawing. Application January 28, 1952, Serial No. 268,662

Claims priority, application Great Britain February 5, 1951

7 Claims. (Cl. 167—30)

This invention relates to new bactericidal substances and more particularly it relates to new bisbiguanides which possess bactericidal properties and to processes for the manufacture of the said new bisbiguanides.

According to our invention we provide the new bactericidal substances which are represented by the generic formula:

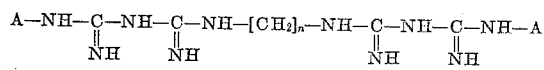

wherein A stands for a phenyl radical, which is substituted by alkyl, alkoxy, nitro or halogen and wherein the two A's may be the same or different and wherein $n$ is an integer from 3 to 9 inclusive and wherein the polymethylene chain may be interrupted by oxygen atoms and/or by aromatic nuclei.

According to a further feature of the invention we provide a process for the manufacture of the said new bactericidal substances which comprises interaction of a suitable polymethylene bisdicyandiamide with one or more amines of the formula A—$NH_2$ wherein A has the meaning stated above.

According to yet a further feature of the invention we provide another process for the manufacture of the said new bactericidal substances which comprises interaction of a suitable polymethylenediamine with a dicyandiamide of the formula A—NH—C(:NH)—NH—CN wherein A has the meaning stated above.

As stated above, the new substances are useful as bactericides. We have found for example that those of the new substances which are of the formula

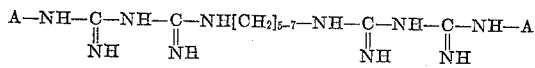

wherein A stands for a halogen substituted phenyl radical, possess very high antibacterial activity when tested in vitro against the organisms Streptococcus haemolyticus, Staphylococcus aureus, Bacillus coli, Clostridium welchii and Pseudomonas pyocyanea.

Because of their high degree of antibacterial activity the new substances are useful for many purposes, for example in medical and surgical practice for sterilisation of instruments or of body tissues, as additions to wood pulp to obviate the decay consequent on the growth of fungi and bacteria, as additives to rubber latex likewise for preservative purposes, for the control of slime in paper mills and they are useful also as moth-proofing agents for textiles.

The invention is illustrated but not limited by the following examples in which the parts are by weight.

Example 1

25 parts of hexamethylene bis-dicyandiamide, 35 parts of p-chloroaniline hydrochloride and 250 parts of β-ethoxyethanol are stirred together at 130–140° C. for 2 hours under reflux. The mixture is then cooled and filtered and the solid is washed with water and crystallised from 50% aqueous acetic acid. 1:6-di-($N_1$:$N_1'$-p-chlorophenyldiguanido - $N_5$:$N_5'$) - hexane dihydrochloride is obtained as colourless plates of M. P. 258–260° C.

Example 2

19.4 parts of p-chlorophenyldicyanidamide, 9.4 parts of hexamethylenediamine dihydrochloride and 100 parts of nitrobenzene are stirred together and heated at 150–160° C. for 6 hours. The mixture is cooled, diluted with 200 parts of benzene and filtered. The solid residue is washed with benzene and crystallised from 50% acetic acid. 1:6 - di - ($N_1$:$N_1'$ - p - chlorophenyldiguanido-$N_5$:$N_5'$)-hexane dihydrochloride is obtained, identical with that prepared as described in Example 1.

Example 3

25 parts of hexamethylene bis-dicyandiamide, 29 parts of p-toluidine hydrochloride and 250 parts of β-ethoxyethanol are stirred and heated together under reflux for 2 hours at 140° C. The mixture is then filtered and the solid is washed with ethanol and crystallised from aqueous β-ethoxyethanol to give 1:6-di-($N_1$:$N_1'$-p-tolyldiguanido - $N_5$:$N_5'$) - hexane dihydrochloride as colourless crystals of M. P. 263–264° C.

In a similar manner 1:6-di-($N_1$:$N_1'$-p-anisyldiguanido-$N_5$:$N_5'$)-hexane dihydrochloride is obtained from hexamethylene bis-dicyandiamide (25 parts) and p-anisidine hydrochloride (32 parts). It crystallises from a mixture of methanol and ethanol (1:6) in needles of M. P. 238–240° C.

Example 4

21 parts of trimethylene bis-dicyandiamide, 33 parts of p-chloroaniline hydrochloride and 200 parts of β-ethoxyethanol are stirred together at 140–150° C. under reflux for 4 hours. The mixture is cooled and diluted with 80 parts of dry ether and the solid is separated and dissolved in hot water. The solution is filtered and the filtrate allowed to cool. The solid consists of 1:3-di-($N_1$:$N_1'$ - p - chlorophenyldiguanido-$N_5$:$N_5'$)- pentane dihydrochloride, M. P. 221–222° C. with decomposition.

Example 5

22 parts of tetramethylene bis-dicyandiamide, 33 parts of p-chloroaniline hydrochloride and 200 parts of β-ethoxyethanol are stirred together at 140–150° C. under reflux for 3 hours. The mixture is then cooled and filtered and the solid is washed with ethanol and crystallised from hot water. 1:4-di-($N_1$:$N_1'$-p-chlorophenyldiguanido-$N_5$:$N_5'$)-butane dihydrochloride is obtained, M. P. 253–254° C.

Example 6

24 parts of pentamethylene bis-dicyandiamide, 33 parts of p-chloroaniline hydrochloride and 200 parts of β-ethoxyethanol are stirred together at 140–150° C. under reflux for 6 hours. The mixture is then cooled and the solid is washed with ethanol and crystallised from hot water. 1:5-di-($N_1$:$N_1'$ - p - chlorophenyldiguanido - $N_5$:$N_5'$) - pentane dihydrochloride is obtained as small colourless needles, M. P. 250° C.

Example 7

26 parts of heptamethylene bis-dicyandiamide, 33 parts of p-chloroaniline hydrochloride and 250 parts of β-ethoxyethanol are stirred together at 140–150° C. under reflux for 90 minutes. The mixture is then cooled and filtered and the solid is washed with ethanol and recrystallised from hot water. 1:7 - di - ($N_1$:$N_1'$- p - chlorophenyldiguanido-$N_5$:$N_5'$) -heptane dihydrochloride is obtained as a colourless crystalline solid of M. P. 253–254° C.

Example 8

10 parts of hexamethylene bis-dicyandiamide, 13.2 parts of m-chloroaniline hydrochloride and 100 parts of β-ethoxyethanol are stirred together at 145° C. under reflux for 9 hours. The mixture is cooled and the filtrate is diluted with water and filtered. Ammonium chloride in 10% aqueous solution is added to the filtrate which is again filtered and the solid so obtained is crystallised from 50% aqueous ethanol. 1:6-di-($N_1$:$N_1'$-m-chlorophenyldiguanido-$N_5$:$N_5'$)-hexane dihydrochloride is obtained as a colourless crystalline solid, M. P. 233–234° C.

Example 9

10 parts of hexamethylene bis-dicyandiamide, 15.1 parts of 2:5-dichloroaniline hydrochloride and 100 parts of β-ethoxyethanol are stirred together under reflux for 3 hours. The mixture is cooled and filtered and the solid is washed with acetone. It is then recrystallised from 40% aqueous ethanol. 1:6-di-($N_1$:$N_1'$-2:5-dichlorophenyldiguanido-$N_5$:$N_5'$)-hexane dihydrochloride is obtained as cream-coloured needles, M. P. 249–250° C.

Example 10

10 parts of hexamethylene bis-dicyandiamide, 15 parts of 3:4-dichloroaniline hydrochloride and 50 parts of β-ethoxyethanol are stirred together under reflux at 140–145° C. for 9 hours. The mixture is cooled and 50 parts of β-ethoxyethanol are added. It is then filtered and the solid is washed with ethanol and acetone. 1:6-di-($N_1$:$N_1'$-3:4-dichlorophenyldiguanido - $N_5$:$N_5'$) - hexane dihydrochloride is obtained as colourless crystals, M. P. 259–260° C.

Example 11

10 parts of 1:4 - di - n - propoxybenzene - ω:ω'-bis-dicyandiamide, 10 parts of p-chloroaniline hydrochloride and 100 parts of β-ethoxyethanol are heated together under reflux at 140–145° C. for 9 hours. The solid is washed with acetone and crystallised from 50% ethanol. The colourless crystalline ω:ω'-di($N_1$:$N_1'$-p-chlorophenyldiguanido-$N_5$:$N_5'$)-1:4-di-n-propoxybenzene dihydrochloride so obtained has M. P. 247–249° C.

Example 12

10.2 parts of hexamethylene bis-dicyandiamide, 14.7 parts of m-nitroaniline hydrochloride and 70 parts of 70% aqueous dioxan are mixed and the mixture is stirred and heated under reflux for 10 hours. It is then cooled and 200 parts of water and 52 parts of saturated brine are added. It is then filtered and the solid is washed with water and recrystallised from water. 1:6-di-($N_1$:$N_1'$ - m - nitrophenyldiguanido - $N_5$:$N_5'$) - hexane dihydrochloride is obtained as a pale yellow crystalline solid M. P. 234–235° C.

What we claim is:

1. New bactericidal substances which in their free base form have the formula:

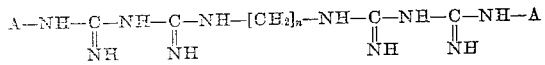

wherein A stands for a chlorinated phenyl radical selected from the group consisting of mono- and dichlorinated phenyl radicals and wherein $n$ is selected from the integers 5, 6 and 7.

2. 1:6 - di($N_1$:$N_1'$ - p - chlorophenyldiguanido - $N_5$:$N_5'$) - hexane.
3. 1:5 - di($N_1$:$N_1'$ - p - chlorophenyldiguanido - $N_5$:$N_5'$) - pentane.
4. 1:7 - di($N_1$:$N_1'$ - p - chlorophenyldiguanido - $N_5$:$N_5'$) - heptane.
5. 1:6 - di($N_1$:$N_1'$ - m - chlorophenyldiguanido - $N_5$:$N_5'$) - hexane.
6. 1:6 - di($N_1$:$N_1'$ - 2:5 - dichlorophenyldiguanido - $N_5$:$N_5'$) - hexane.
7. The method of destroying bacteria which comprises subjecting the bacteria to the action of a substance which in its free base form has the formula:

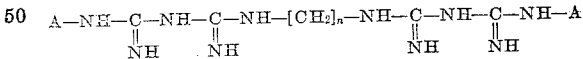

wherein A stands for a chlorinated phenyl radical selected from the group consisting of mono- and dichlorinated phenyl radicals and wherein $n$ is selected from the integers 5, 6 and 7.

References Cited in the file of this patent

UNITED STATES PATENTS

| Number | Name | Date |
|---|---|---|
| 2,255,090 | Tinker et al. | Sept. 9, 1941 |
| 2,455,896 | Nagy | Dec. 7, 1948 |

FOREIGN PATENTS

| Number | Country | Date |
|---|---|---|
| 239,001 | Switzerland | Dec. 3, 1945 |
| 632,572 | Germany | July 16, 1936 |

OTHER REFERENCES

Slotta et al., "Ber. deut. Chem.," vol. 62 (1929), page 1404.